US005772268A

United States Patent [19]

Chabrier

[11] Patent Number: 5,772,268

[45] Date of Patent: Jun. 30, 1998

[54] PAPER HANDLING AID

[76] Inventor: Alicia Chabrier, 2909 Rd. 76, Pasco, Wash. 99301

[21] Appl. No.: 544,025

[22] Filed: Oct. 17, 1995

[51] Int. Cl.[6] .................................. B25J 1/02; B65H 3/20

[52] U.S. Cl. ............................................ 294/1.1; 294/64.1

[58] Field of Search .................................... 294/1.1, 19.1, 294/25, 64.1; 15/104.002; 221/210; 271/33

[56] References Cited

U.S. PATENT DOCUMENTS

| | | | |
|---|---|---|---|
| 2,345,205 | 3/1944 | MacChesney | 294/64.1 X |
| 2,622,913 | 12/1952 | Hopp | 294/64.1 |
| 2,910,624 | 10/1959 | Lindenberger | 294/64.1 X |
| 3,087,268 | 4/1963 | Rice | 40/104 |
| 3,697,111 | 10/1972 | Thompson | 294/64.1 |
| 4,073,530 | 2/1978 | Seidler | 294/1.1 X |
| 4,214,785 | 7/1980 | Broch | 294/64.1 |
| 4,600,227 | 7/1986 | Ennis et al. | 294/1.1 |
| 4,653,789 | 3/1987 | McWilliams et al. | 294/1.1 |
| 4,667,996 | 5/1987 | Gaspar | 294/61 |
| 4,848,815 | 7/1989 | Molloy | 294/1.1 |

FOREIGN PATENT DOCUMENTS

| | | | |
|---|---|---|---|
| 441595 | 1/1968 | Switzerland | 294/64.1 |
| 842170 | 7/1981 | U.S.S.R. | 294/64.1 |

*Primary Examiner*—Johnny D. Cherry
*Attorney, Agent, or Firm*—Floyd E. Ivey

[57] ABSTRACT

The present invention relates to devices and aids in the process of handling paper products including page turning, paper and card sorting, paper separating, obtaining a paper coffee filter from a stack of filters and other actions requiring the separation of, moving of or obtaining of a paper or paper sheet product from among a group of such products. Additionally, the present invention will have applications, in particular for individuals with limitations in the use of fingers, hands and arms, related to the lifting of other light weight products. Other applications relate to the anchoring or fixing of certain products to particular surfaces thus providing, for example, eyeglass, pencil, pen and key holders.

3 Claims, 9 Drawing Sheets

PAPER HANDLING AID

FIELD OF THE INVENTION

The present invention relates generally to devices and aids used for handling paper products and relates in particular to devices and aids which assist in the turning of book or magazine pages, the sorting or separating of stacks, reams or sheafs of paper and cards, obtaining a single paper coffee filter or paper baking cup from a stack of compressed and formed filters or cups and other such activities involving stacks of paper products. This invention relates particularly to the handling of paper products which are compressed or stuck together and will be of direct assistance to those who have a limited use of the hands or fingers.

BACKGROUND OF THE INVENTION

Individuals with and without limitations in the use of fingers, hands or arms frequently encounter difficulty in handling paper products including the usually simple acts of turning pages of books, magazines or coloring books, handling flash cards or playing cards and in separating paper coffee filters and baking cups from a packaged stack of such items. Such paper products are sometimes pressed or stuck together posing problems in page turning and lifting and item separation. A variety of devices have been previously disclosed for the purpose of assisting in activities such as turning pages as shown in U.S. Pat. No. 3,087,268 to Rice and in assisting in separating individual coffee filters from a stack of filters as shown in U.S. Pat. No. 4,667,996 to Gaspar. These patents are disclosed in accordance with 37 CFR 1.97 via an Information Disclosure Statement. However, the devices or methods disclosed in the prior art does not generally provide a lifting of the paper product such as is disclosed herein. Additionally, the prior art often consists of complex mechanical devices. The present disclosure is a simple and inexpensive means of providing such assistance.

SUMMARY OF THE INVENTION

In accordance with the present invention, the use of readily available reusable adhesive is disclosed for the turning of pages of books and magazines, the lifting of sheets of paper, the separation of coffee filters and baking cups and for other purposes related to the handling of paper products. Additionally, the present disclosure will have applications, certainly for those with limitations in the use of fingers, hands and arms, related to the lifting of other light weight products. Other applications relate to the anchoring or fixing of certain products to particular surfaces thus providing, for example, eyeglass, pencil, pen and key holders.

The disclosure of this invention is a suction cup having a handle means with an application of a thin layer of reusable adhesive on the suction surface of the suction cup. The handle means is maneuvered by the user to position the adhesive coated surface so as to grasp, by adhesion, paper products and thus permit a lifting function for page turning, coffee filter separation and other such actions. The handle means may be such that can be grasped between thumb and finger or palm, or between fingers or toes; alternative means may encircle the hand allowing the user to favorably position the adhesive coated surface without undue use of limited mobility fingers; a yet additional means may affix to the head allowing the direction of a shaft, terminating in an adhesive coated surface, so as to position the adhesive surface against the paper or other product desired to be lifted, turned or otherwise repositioned; a similar use would employ a handle means which could be maneuvered by a foot or feet to effect the indicated result. A variety of handle means will be employed with the recognized use of polyethylene tubing and pens, pencils and markers of different lengths and shapes discussed herein but with such not imposing a limitation on the handle means available.

The disclosure of this invention employs an ordinary suction cup or cups, "reusable adhesive" (a product employed as a replacement for tacks and nails when hanging posters and other light weight objects on a wall) and polyethylene tubing. The suction cup used herein is a common product available for example from Serv-A-Lite®, 3451 Morton Drive, East Moline, Ill. 61244 as mini, small, medium and large suction cups, sizes ¾" to 2½" diameters, stock numbers CSS-250/CSS-100, CS-100/CS-25, C-100/C-25, and CL-50. The function of the suction cup, in this disclosure, is both as a receptacle for the adhesive product which is easily adapted with a variety of handle means and as a handle. However, the function of the suction cup as described in this disclosure may also be provided by other means which would offer a surface to receive adhesive means and provide handle means.

The reusable adhesive product is available from several suppliers including as examples DAP™ Fun-Take® Reusable Adhesive by DAP Inc., Dayton, Ohio 45401; Handi-Tak® from Super Glue Corporation, Hollis, N.Y. 11423; INTAC™ E-Z-TAK manufactured by International Adhesives Corp., Pembroke Park, Fla. 33009; LOCTITE® Task-Ups™ distributed by Loctite Corporation, Automotive and Consumer Group, Cleveland, Ohio 44182; LOCTITE® DeskSet™ distributed by Loctite Corporation, North American Group, Rocky Hill, St 06067; and MANCO® POSTER PUTTY™ from MANCO, INC. 830 Canterbury Road, Westlake, Ohio 44145-1462. The particular adhesive property of DAP™ Fun-Tak® is preferred in this disclosure. The characteristic required in the adhesive function and that which is provided by DAP™ Fun-Tak® is the ready ability of the product or adhesive to stick to a paper or other surface and then as readily separate from such a surface. Other adhesive products may be used to coat the suction or adhesive surface and provide the desired lifting function. The present disclosure focuses on the reusable adhesive but does not limit the use of other adhesives to fulfill the function of the disclosure.

The purpose of the polyethylene tubing in this disclosure is to facilitate the formation of a variety of handle means via a product which is readily available commercially. This disclosure utilizes such tubing with ⅜"i.d./½"o.d., 3⁄16"i.d./5⁄16"o.d., and 5⁄16"i.d./7⁄16"o.d. Other materials such as wood doweling, pencils, and cabinet knobs are also employed in forming handle means. The polyethylene tubing and doweling simply offers easily obtained materials from which handle means may be formed and does not limit the means which might be used or substituted for the handle function.

The focus of the present disclosure is the use of "reusable adhesive" to perform actions as described above. An object of the disclosure is to provide handle means of simple construction which can easily be fitted to the user. The preferred embodiment is the application of the "reusable adhesive" to the suction surface of a suction cup with the suction cup guided by a handle means determined by the users needs or limitations.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIGS. 4A and 4B demonstrate a method of using the handle means shown in FIG. 4.

DETAILED DESCRIPTION

Figure 1:
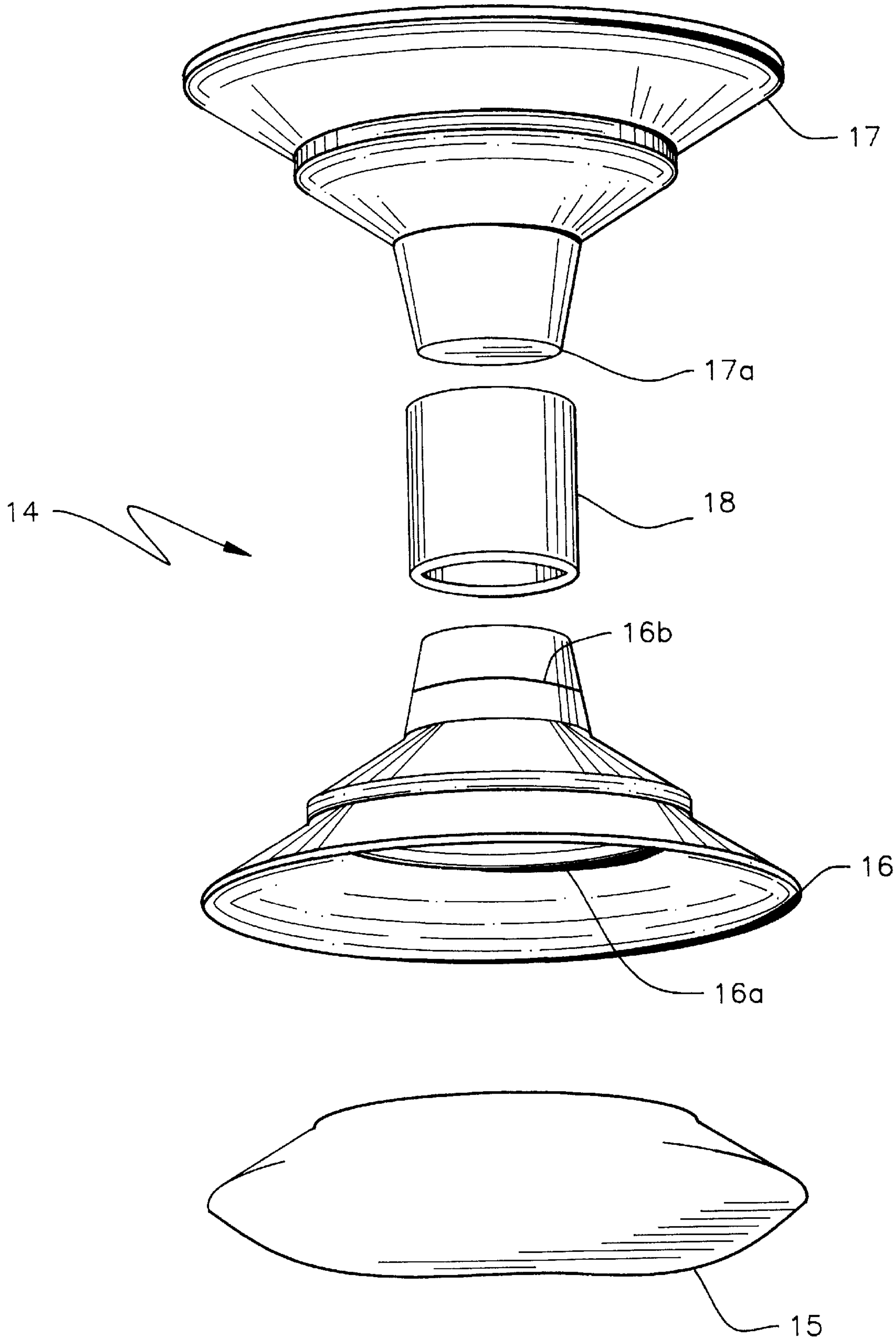
FIG. 1 is an exploded view of a Paper Handling Aid displaying the reusable adhesive 15, a first suction cup 16, a connector means (polyethylene tube) 18 and a second suction cup 17 serving as a handle means.
Figure 1A:
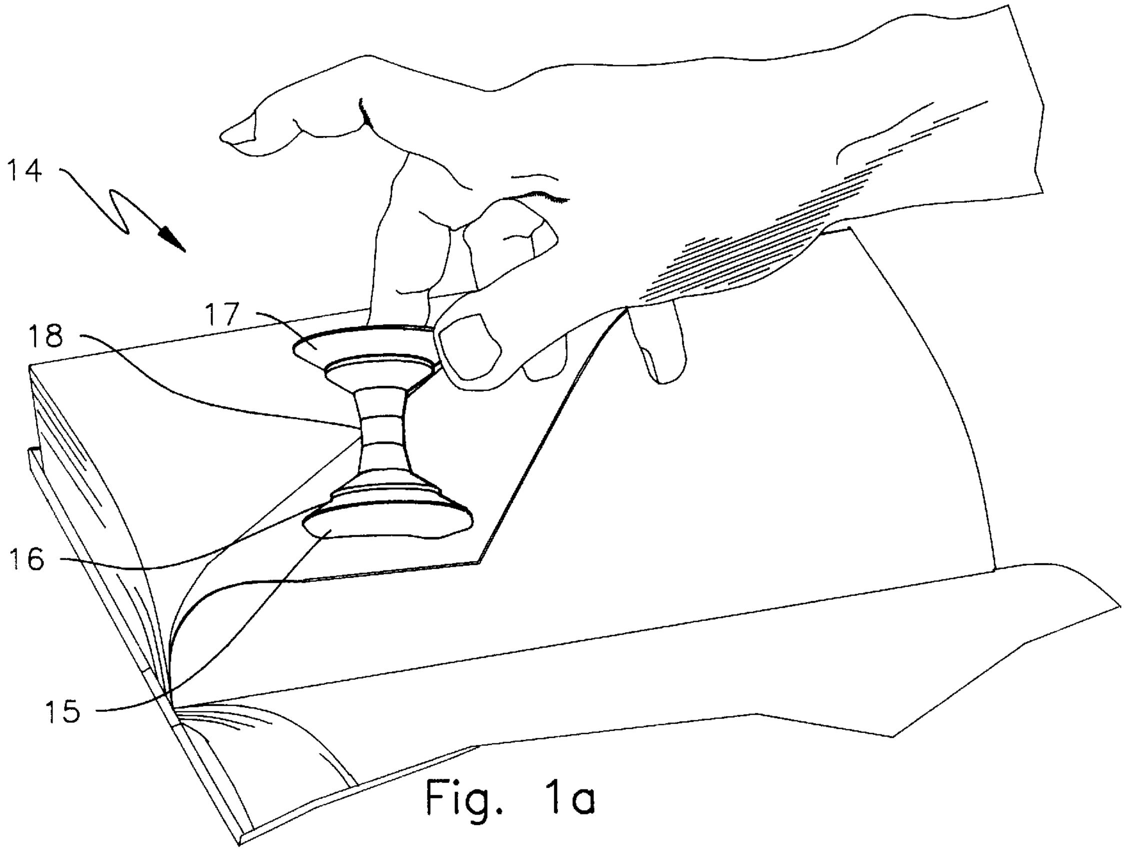
FIG. 1A and 1B demonstrate two methods of grasping the handle means shown in FIG. 1.
Figure 1B:
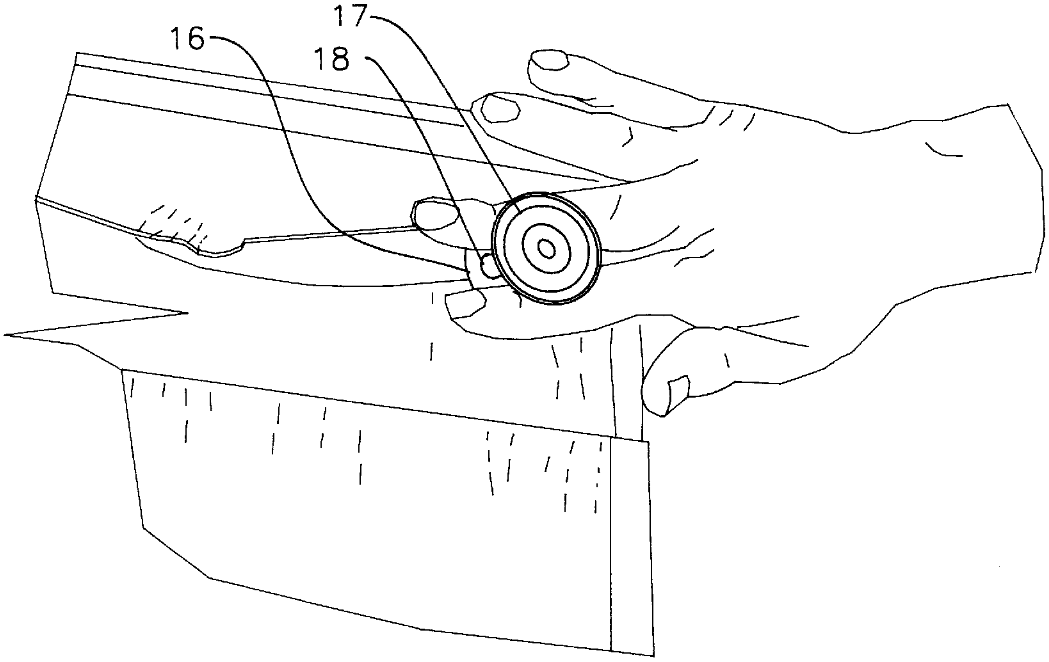

The Paper Handling Aid of FIGS. 1, 1A and 1B illustrates the Paper Handling Aid 14 and is the preferred embodiment of the present disclosure wherein ½ oz. reusable adhesive 15 is affixed by adhesion to the suction surface 16A of a first suction cup 16 (small suction cup 1½" diameter). A connector means (1¼" length ⅜"i.d./½"o.d. polyethylene tube) 18 joins the first suction cup extension 16B to the second suction cup extension 17A of a second suction cup 17 (small suction cup 1½" diameter) which serves as a handle means.

Figure 2:
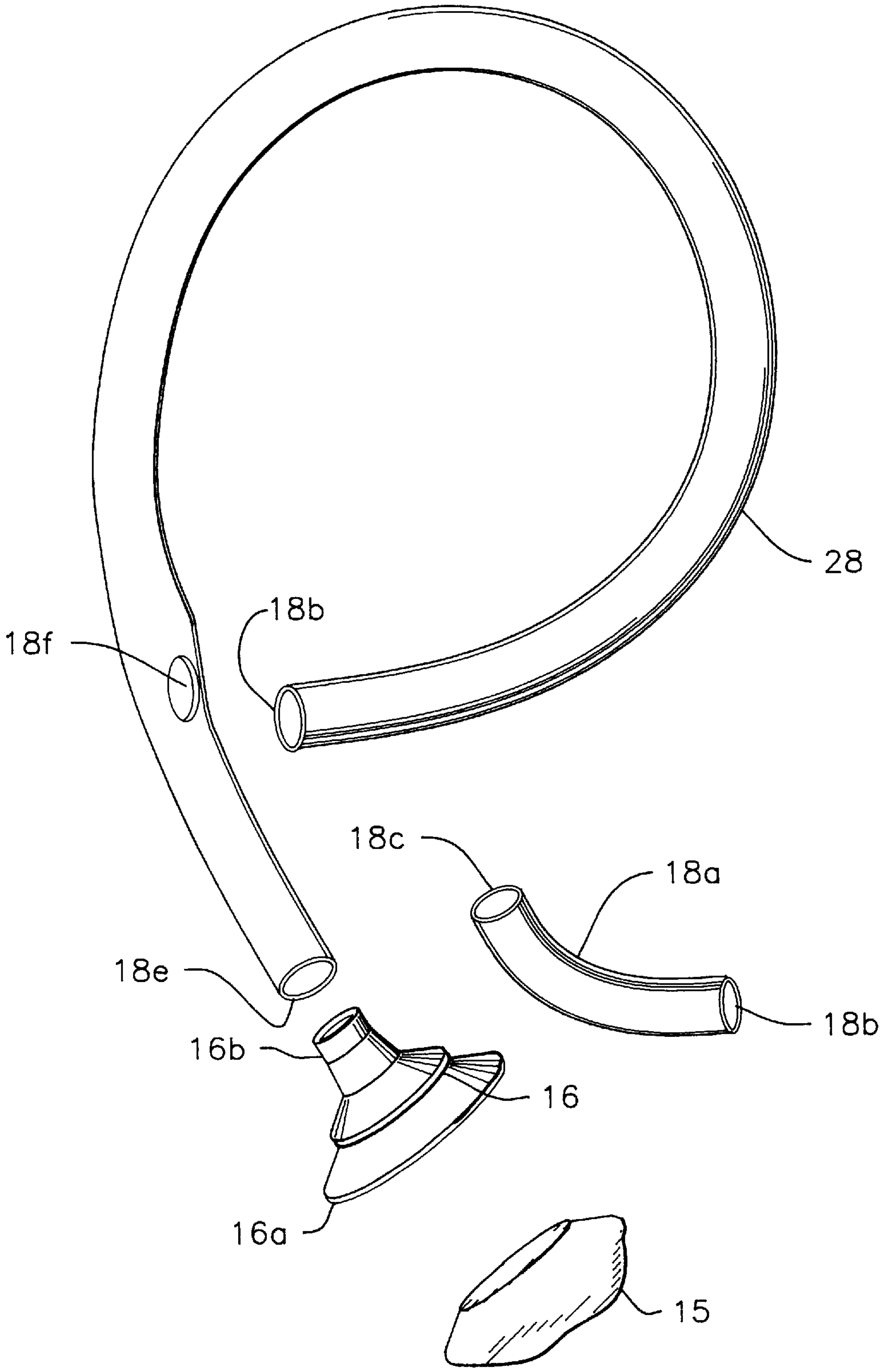
FIG. 2 is an exploded view of a Paper Handling Aid demonstrating the reusable adhesive 15, a suction cup 16 and a handle means 18, 18A configuration which could encircle a person's hand.
Figure 2A:
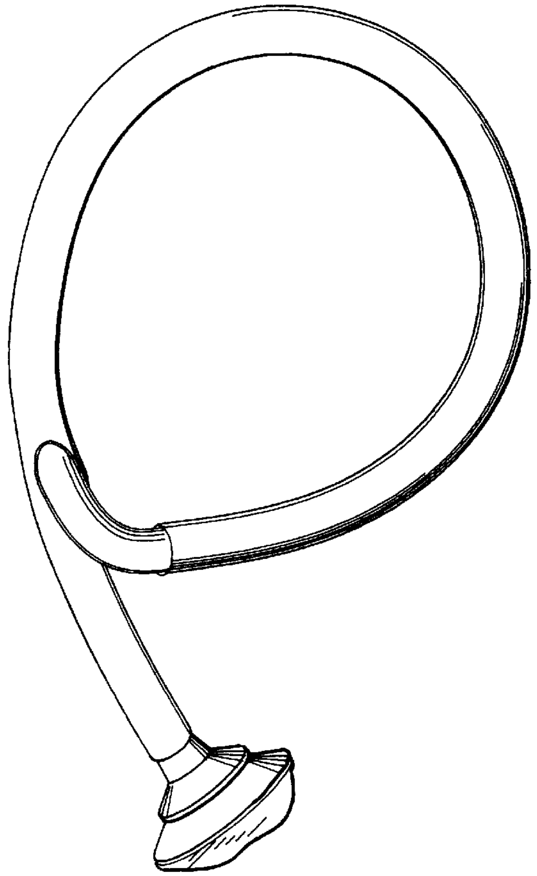
FIGS. 2A and 2B demonstrate two methods of grasping the handle means shown in FIG. 2.
Figure 2B:
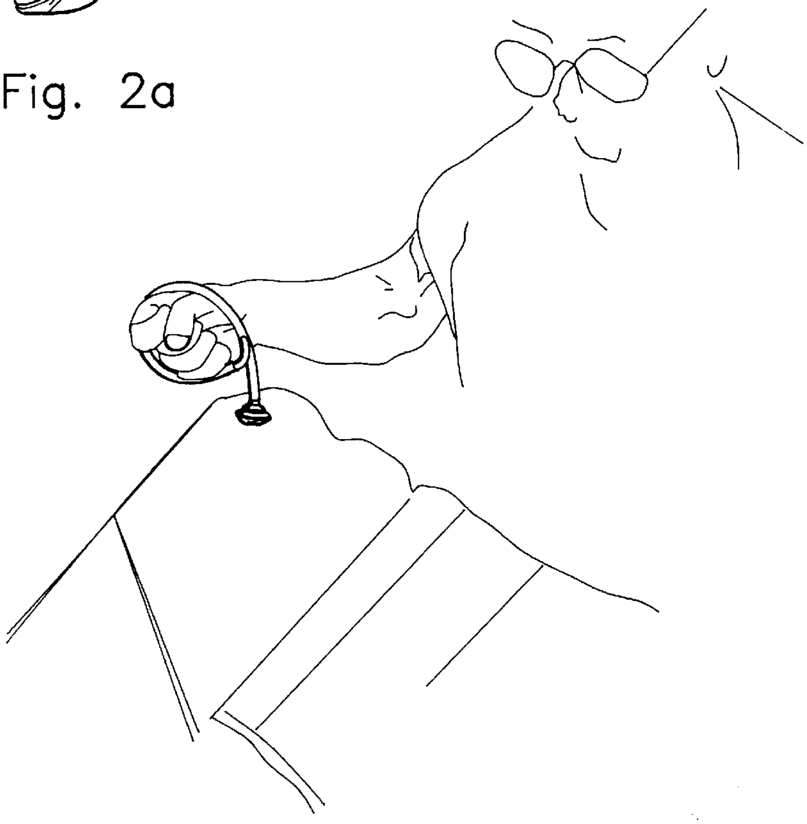

An alternative embodiment of the Paper Handling Aid is illustrated in FIGS. 2, 2A and 2B wherein ½ oz. reusable adhesive 15 is affixed by adhesion to the suction surface 16A of a suction cup 16 (small suction cup 1⅛" diameter). A handle means 28 (5/16"i.d./7/16"o.d. polyethylene tube) is formed into a loop configuration which will accept a user's hand as demonstrated in FIG. 2B. The handle means 28 may be formed of a polyethylene tube having a first and a second tube end 18D, 18E and a tube connector aperture 18F (5/16" diameter) intermediary between the first and second tube ends 18D, 18E. A connector tube 18A (3/16"i.d./5/16"o.d. polyethylene tube) has first and second connector tube ends 18B and 18C with the first connector tube end 18B received into the first tube end 18D and the second connector tube end 18C received into the tube connector aperture 18F thus comprising a loop and hence a handle means. The suction cup extension 16B is received into the second tube end 18E thereby completing the formation of this embodiment of the Paper Handling Aid.

Figure 3A:
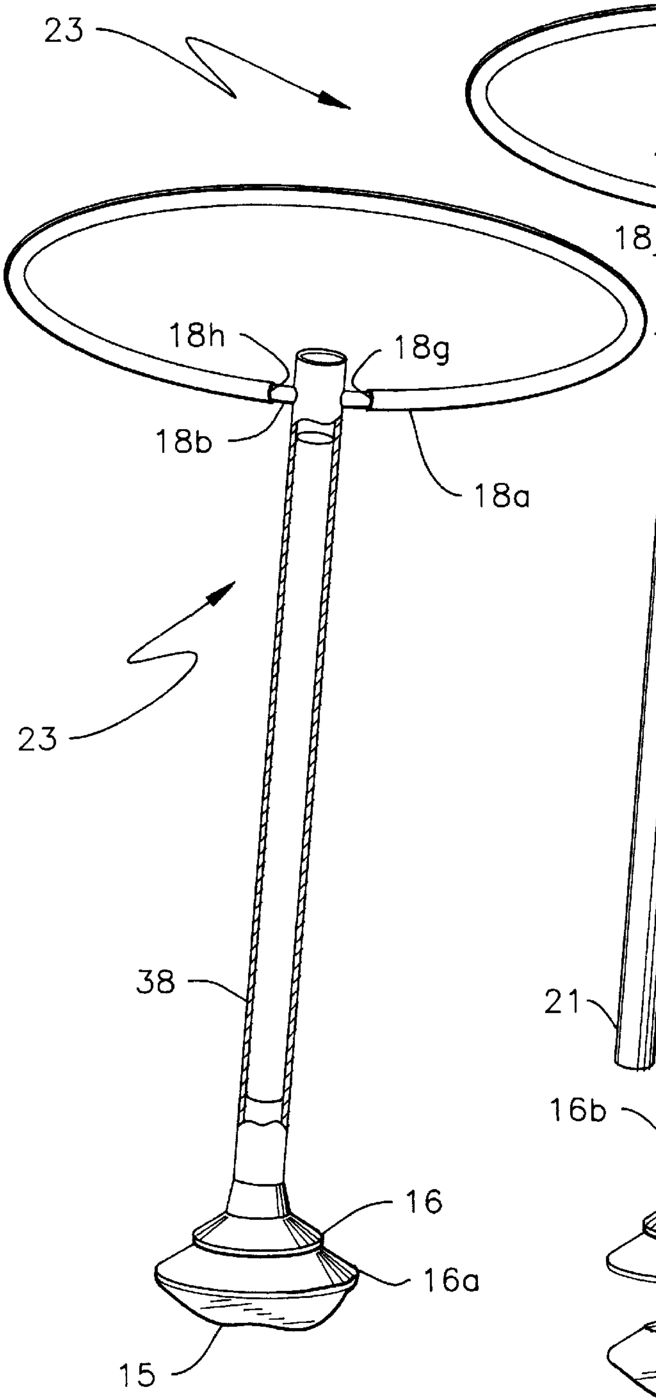
FIG. 3A shows the assembled Paper Handling Aid components of FIG. 3.
Figure 3:
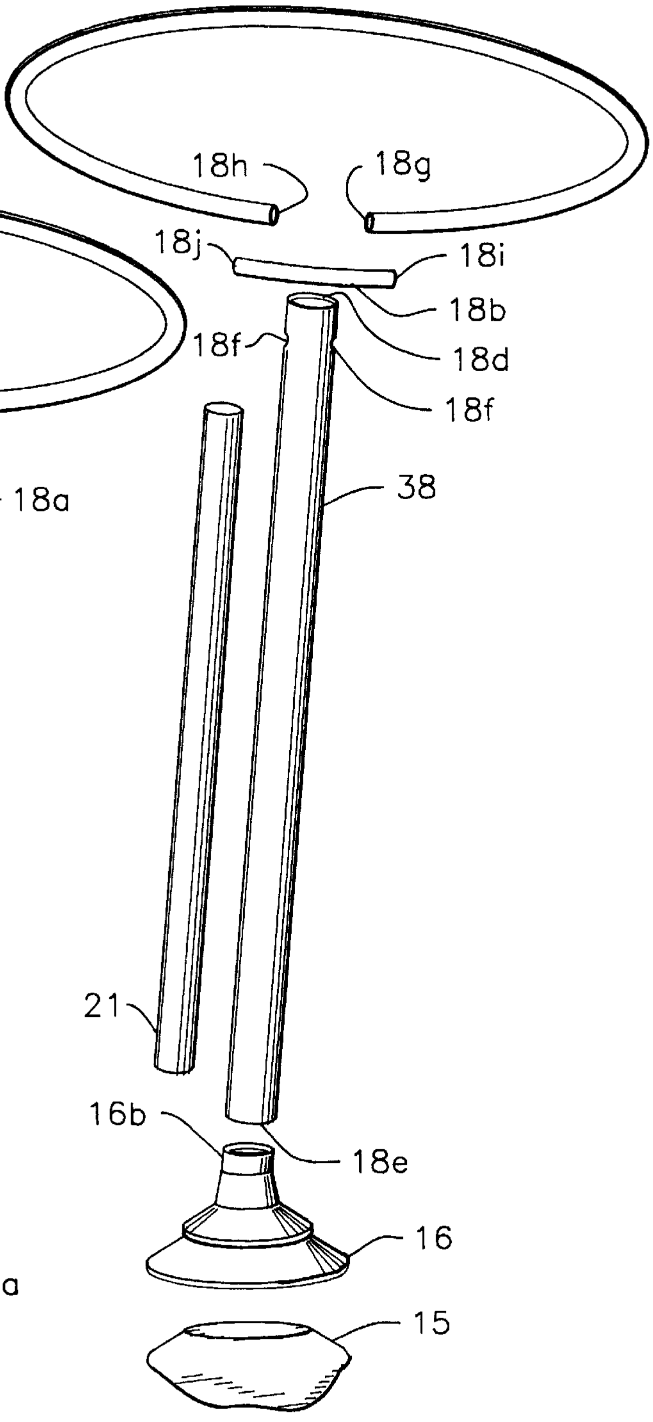
FIG. 3 is an exploded view of a Paper Handling Aid demonstrating the reusable adhesive 15 and a suction cup 16 attached to a handle means comprised of a section of polyethylene tubing 18 strengthened by an inserted shaft of wooden dowel 21 and affixed to a circle of polyethylene to be employed around a person's head.
Figure 3B:
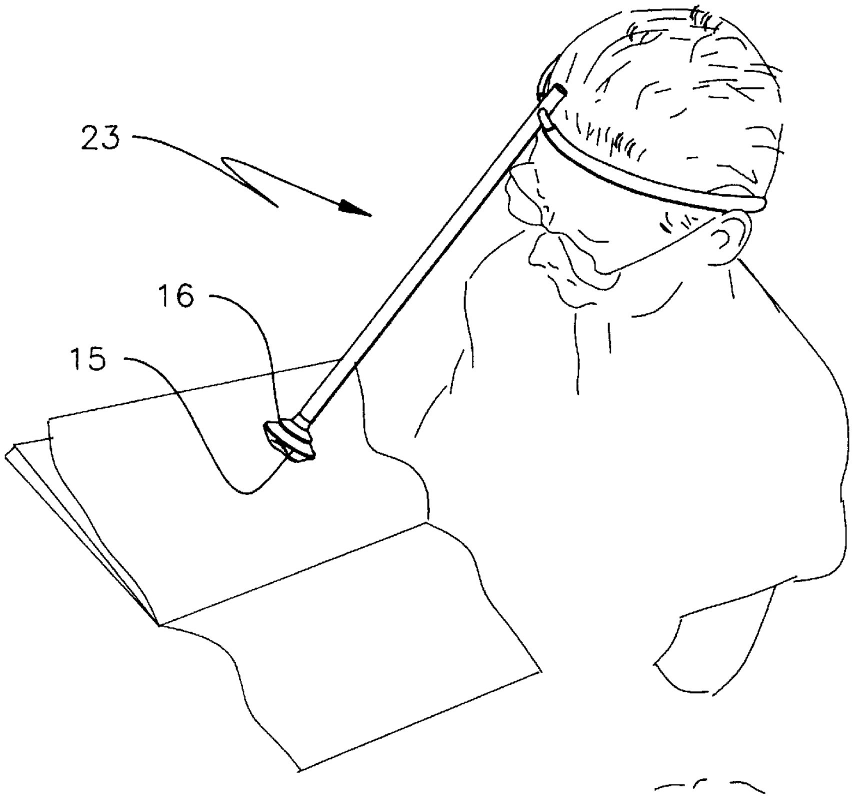
FIGS. 3B and 3C demonstrate a method of using the handle means shown in FIG. 3.
Figure 3C:
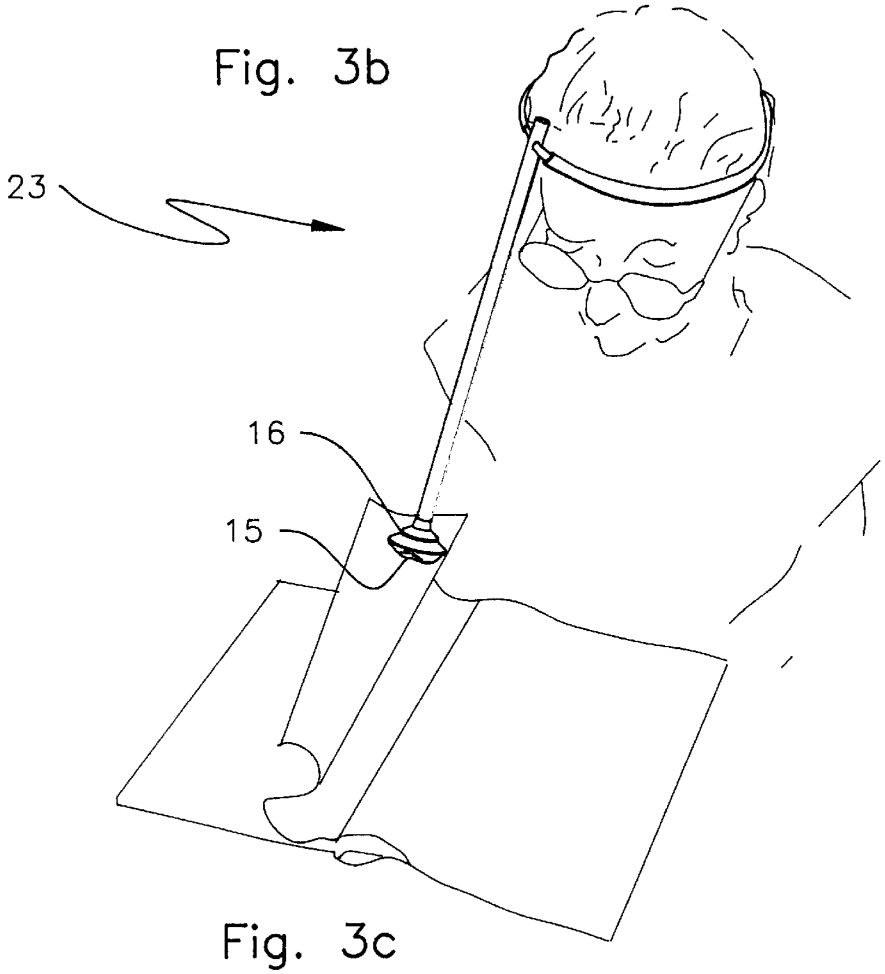

Another embodiment of the Paper Handling Aid is illustrated in FIGS. 3, 3A and 3B wherein ¼ oz. reusable adhesive 15 is affixed by adhesion to the suction surface 16A of a suction cup 16 (mini suction cup ¾" diameter). A handle means assembly 23 (incorporating polyethylene tube and internal shaft/wooden dowel) is formed into a loop configuration, which will fit around a user's head, with a shaft extending from the loop terminating in the suction cup 16 with affixed reusable adhesive 15 as demonstrated in FIGS. 3 and 3A and 3B and 3C. The handle means assembly 23 may be formed essentially of polyethylene tubing with a tube 38 (5/16"i.d./7/16"o.d.) having a first and a second tube end 18D, 18E and tube opposing apertures 18F (5/16" diameter) intermediary between the first and second tube ends 18D, 18E. A wood doweling shaft 21 (5/16" diameter) is received into tube 18 to add rigidity with the length of the shaft 21 less than the length of tube 38. A head loop tube 18A (5/16"i.d./7/16"o.d.) has first and second head loop tube ends 18G and 18H. A connector tube 18B (3/16"i.d./5/16"o.d.) has a first and second connector tube end 18I and 18J with the first connector tube end 18I being received into and through the tube opposing apertures 18F and with said first connector tube end 18I then being received into the first head loop tube end 18G and the second connector tube end 18J being received into the second head loop tube end 18H thus completing the attachment of the head loop tube 18A to the tube 38 extending from the head loop tube 18A. The suction cup extension 16B is received into and hot glued into the second tube end 18E thereby completing the formation of this embodiment of the Paper Handling Aid.

Figure 4:
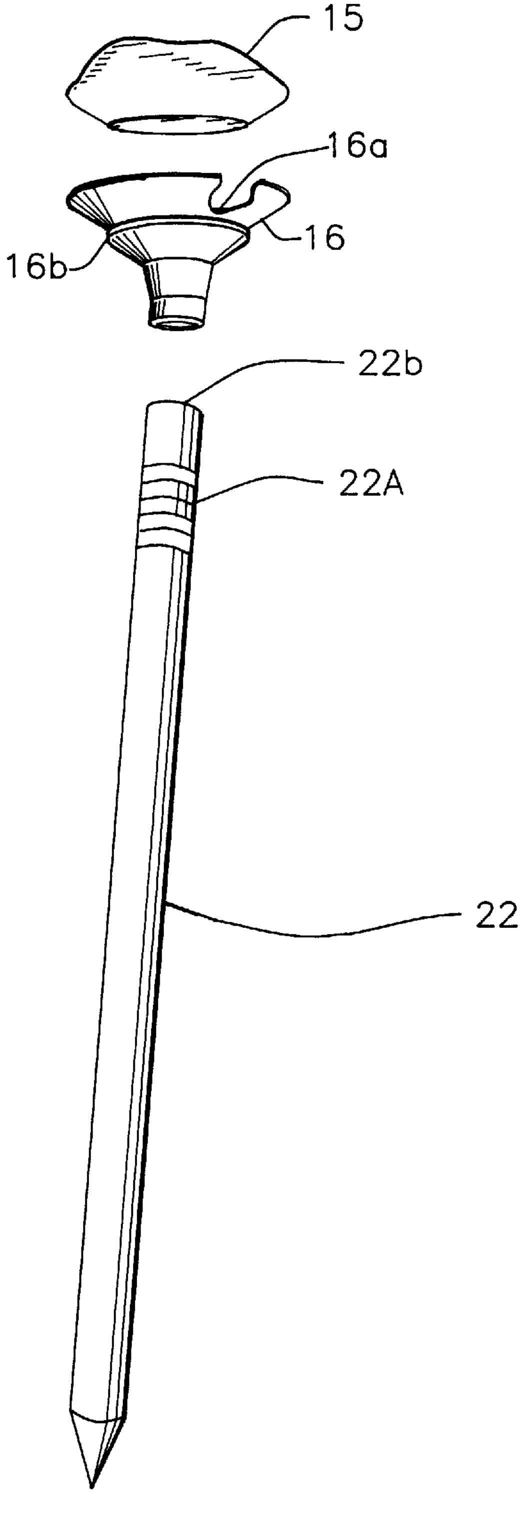
FIG. 4 is an exploded view of a Paper Handling Aid intended to be attached to one end of a pencil 22 where the pencil is the handle means.

Yet another embodiment of the Paper Handling Aid is illustrated in FIGS. 4, 4A and 4B wherein ¼ oz. reusable adhesive 15 is affixed by adhesion to the suction surface 16A of a suction cup 16 (mini suction cup ¾" diameter). A wooden pencil 22 has the eraser removed from an eraser collar 22A having an eraser collar void 22B therein with the suction cup extension 16B received into and hot glued into the eraser collar void 22B. The pencil 22 functions as the handle in this embodiment. Shaft means may be substituted for the pencil 22 where means are provided for the attachment of or affixing of adhesive to one end of the shaft means. This embodiment is shown in use in turning pages in FIGS. 4A and 4B.

Figure 5:
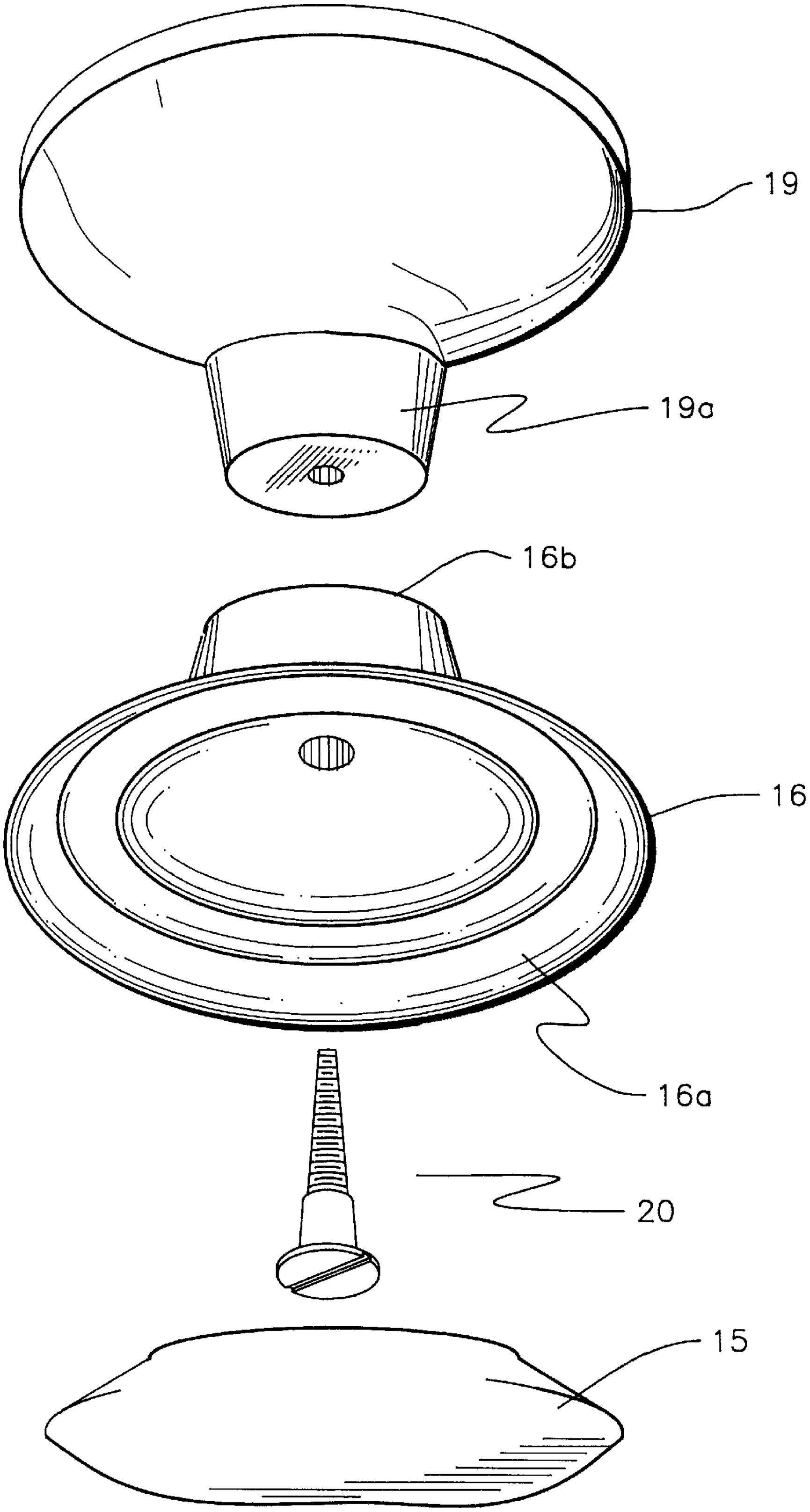
FIG. 5 is an exploded view of a Paper Handling Aid displaying the reusable adhesive 15, a suction cup 16, a connector means (screw) 20 and a cabinet knob 19 serving as the handle means.
Figure 5A:
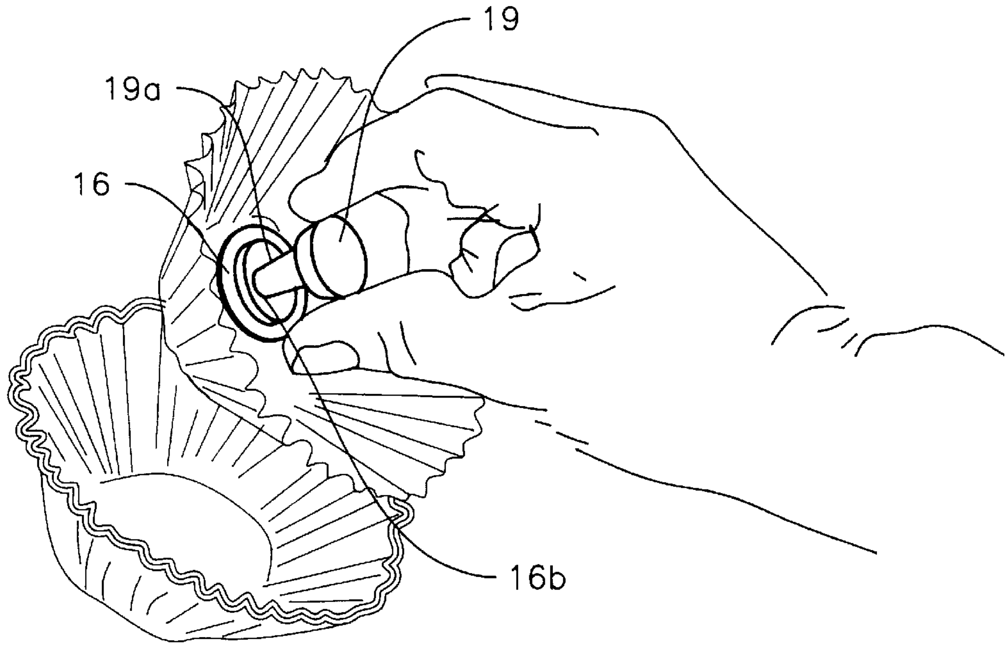
FIGS. 5A and 5B demonstrate the use of a Paper Handling Aid such as that shown in either FIG. 1 or 5 for the purpose of separating baking cups and coffee filters.
Figure 5B:
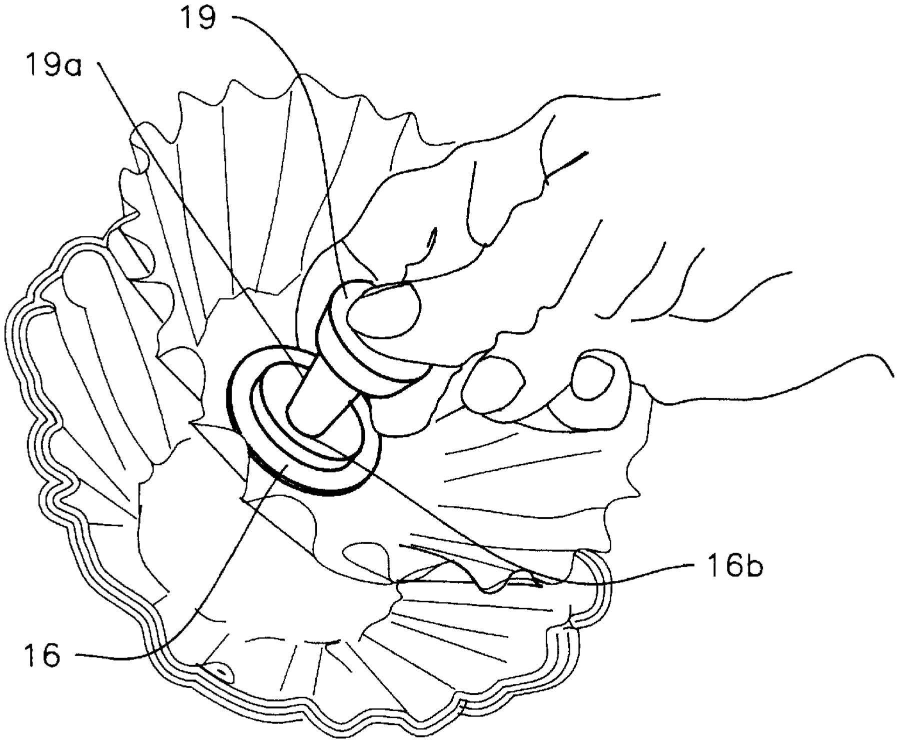

An additional embodiment is illustrated in FIGS. 5, 5A and 5B which is a variation of the embodiment illustrated in FIG. 1 wherein a suction cup 16 (medium suction cup 1⅜" diameter) providing a suction surface 16A and a suction cup extension 16B is affixed by a screw 20 through the suction surface 16A and suction cup extension 16B to a kitchen knob extension 19A of a kitchen knob 19. Reusable adhesive 15, as in the other embodiments, adheres to the suction surface 16A. The kitchen knob 19 serves as the handle in this embodiment. Other handle means may be relied upon and may be attached by means to a surface which receives an adhesive. This embodiment is shown in use in separating coffee filters or baking cups in FIG. 5A and 5B.

Additional embodiments not demonstrated would utilize reusable adhesive to attach containers or holders for eyeglasses, pencils, pens, keys and other small items to surfaces such as dashboards, refrigerator doors and telephones.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A Paper Handling Aid comprising:

A. reusable adhesive affixed by adhesion to a suction surface of a first suction cup having a first suction cup extension; a tube joins the first suction cup extension to a second suction cup extension of a second suction cup which serves as a handle.

2. A paper handling aid comprising:

A. a suction cup having a suction cup extension; handle means affixed to the suction cup extension; the suction cup having a suction surface; adhesive affixed by adhesion to the suction surface;

B. the suction cup is a first suction cup; the extension is a first suction cup extension; the handle means is a second suction cup having a second suction cup extension; a tube joins the first suction cup extension to the second suction cup extension;

C. the adhesive is reusable adhesive.

3. A paper handling aid in accordance with claim 2 wherein:

A. the first suction cup size is in the range of ¾" to 2½" diameter; the second suction cup size is in the range of ¾" to 2½" diameter;

B. the tube joining the first and second suction cup extensions is polyethylene tubing.

* * * * *